United States Patent [19]

Cook

[11] Patent Number: 5,479,804
[45] Date of Patent: Jan. 2, 1996

[54] TOOLS FOR PAINTLESS DENT REPAIR

[75] Inventor: Clay L. Cook, 3013 N. Taylor, Little Rock, Ark. 72207

[73] Assignee: Clay L. Cook, Little Rock, Ark.

[21] Appl. No.: 313,867

[22] Filed: Sep. 28, 1994

[51] Int. Cl.⁶ ................................................. B21J 13/02
[52] U.S. Cl. ................................ 72/35; 72/479; 72/705; 33/608
[58] Field of Search ........................... 72/705, 32, 35, 72/37, 479, 481; 33/288, 608, 1 C, D 21

[56] References Cited

U.S. PATENT DOCUMENTS

| | | |
|---|---|---|
| 1,715,496 | 6/1932 | Faure . |
| 1,897,142 | 2/1933 | Peterson . |
| 2,004,459 | 6/1935 | Boehnke . |
| 2,320,074 | 5/1943 | Golnick . |
| 2,352,009 | 6/1944 | Robbins . |
| 2,435,725 | 2/1948 | Rohde . |
| 2,483,626 | 10/1949 | Daku . |
| 2,490,254 | 12/1949 | Casazza . |
| 2,539,040 | 1/1951 | Sparhawk . |
| 2,600,723 | 6/1952 | Back . |
| 2,605,808 | 8/1952 | Current . |
| 2,745,302 | 5/1956 | Gilstrap . |
| 2,768,544 | 10/1956 | Back . |
| 2,835,155 | 5/1958 | Clark et al. . |
| 3,038,360 | 6/1962 | Mormann . |
| 3,117,480 | 1/1964 | Peddinghaus . |
| 3,120,774 | 2/1964 | Johnson et al. . |
| 3,130,633 | 4/1964 | Rantsch . |
| 3,728,027 | 4/1973 | Watanabe . |

Primary Examiner—Daniel C. Crane
Assistant Examiner—Ed Tolan
Attorney, Agent, or Firm—Hill, Steadman & Simpson

[57] ABSTRACT

A tool for the repair of small dents in the sheet metal surfaces of motor vehicles uses a laser beam assembly as a pointer, instead of a mechanical pointer, and the laser beam produces a sharply focused small dot of light to precisely locate the hidden working head of the tool in exact alignment with the small dent, thereby facilitating efficient removal of the dent.

11 Claims, 2 Drawing Sheets

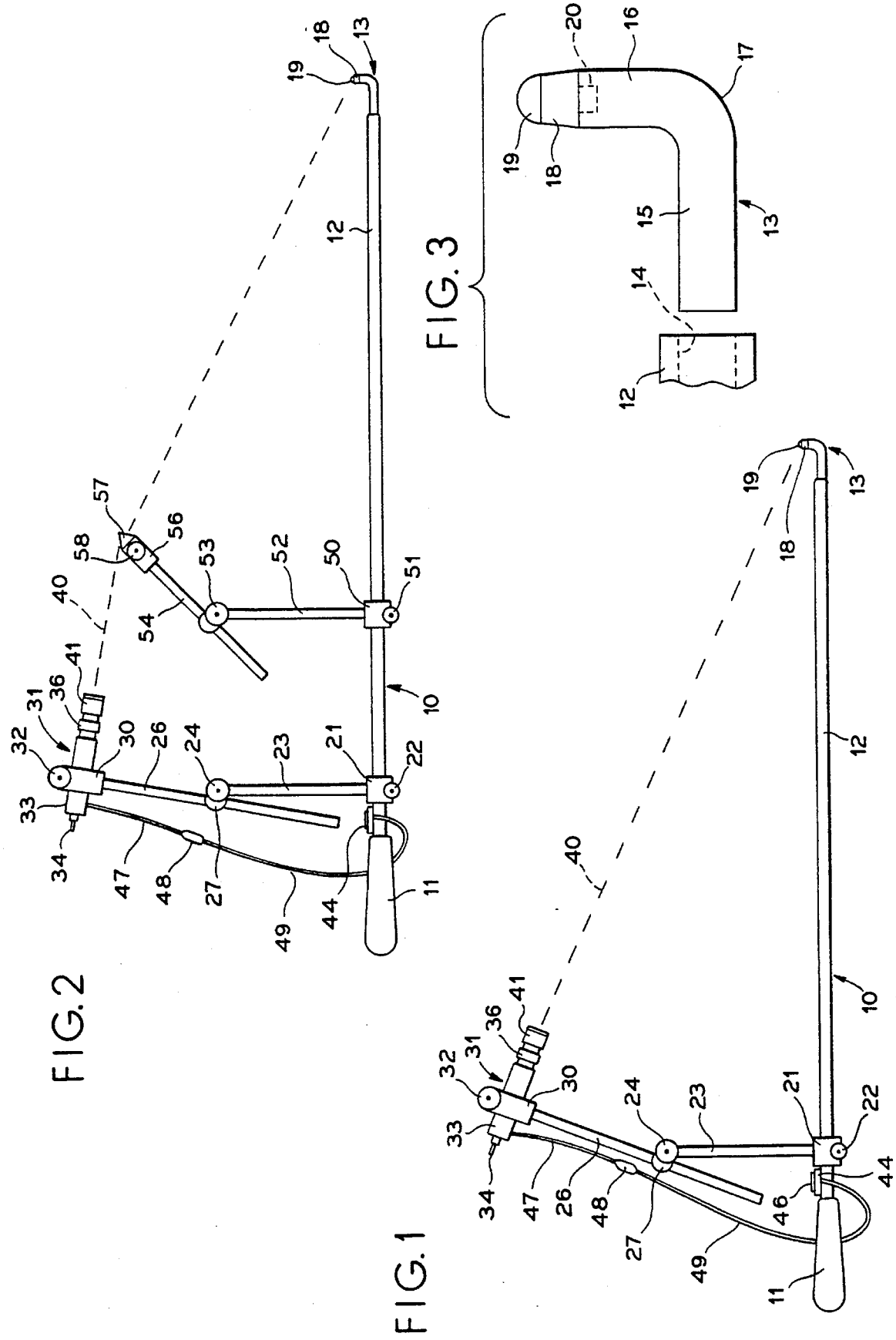

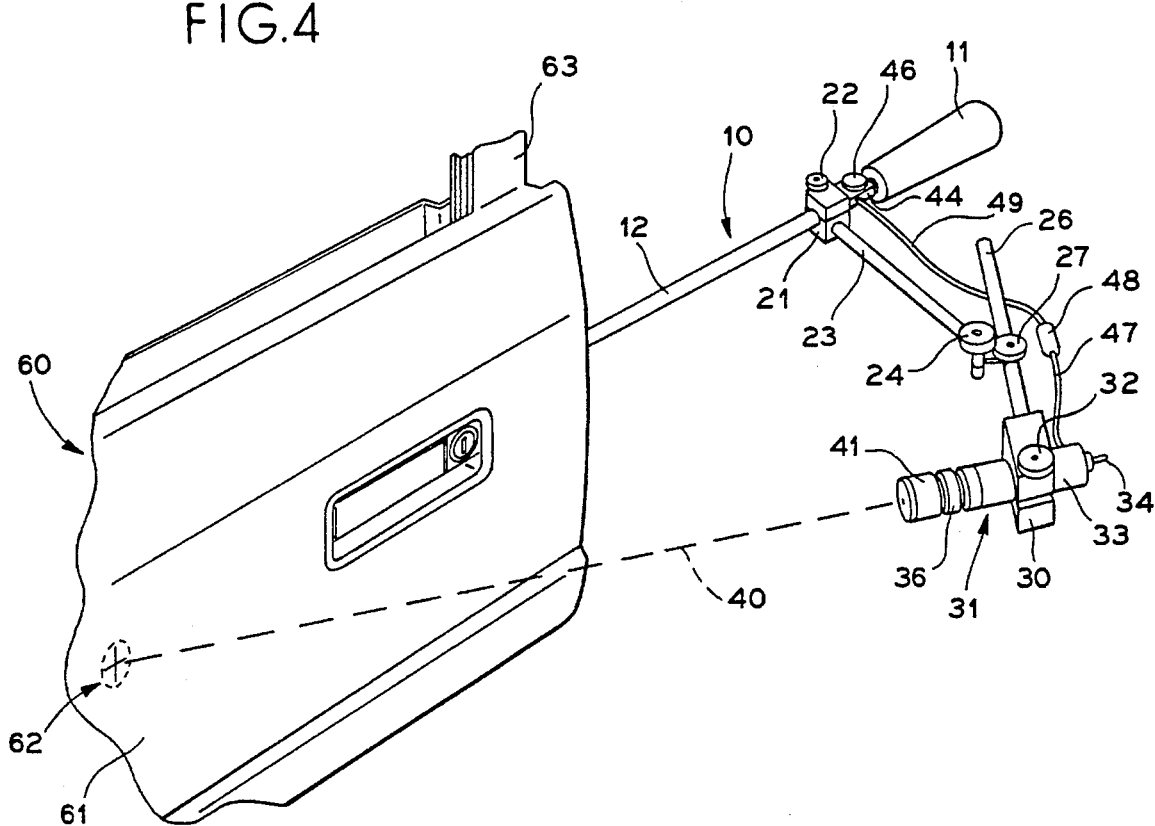
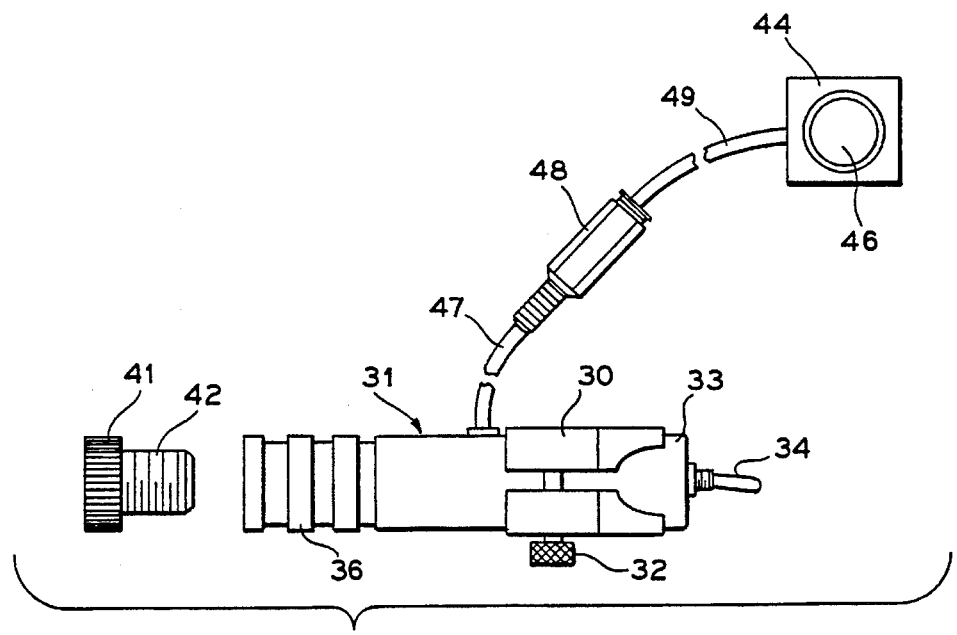

TOOLS FOR PAINTLESS DENT REPAIR

BACKGROUND OF THE INVENTION

1. Field of the Invention

This invention relates generally to the repair of minor dents or "dings" in the sheet metal of vehicles, and more particularly to tools which can be effectively used in the art of so-called paintless dent repair, i.e. , a specialized technique of metalworking that repairs small dents without painting.

2. The Prior Art

In vehicles, such as automobiles, the sheet metal becomes dented for a number of reasons; other auto doors being opened in parking lots and hitting the adjacent automobile, or truck, shopping carts rolling into the vehicle, hail damage from weather storms, and numerous other accidents and occurrences that happen in the life of every vehicle owner/operator.

Heretofore, the art of repairing such small dents or "dings", as they are sometimes referred to, has taken several forms. For example, in one widely practiced technique, the area of the ding is sanded or otherwise abraded to bare the sheet metal, whereupon a filler material such as a substance known commercially as BONDO, or an equivalent material, is used to fill the dent. The area of the dent is then smoothed by grinding or sanding or rubbing and polishing until the damaged area is level, or even with its surrounding sheet metal. The entire area is then re-painted to restore its original appearance.

In the art of so-called paintless dent repair, there has been provided heretofore tools which have a working end which can be manipulated by the user to press the damaged area and force the bent metal to its restored position of alignment with its original surrounding area. However, since most dings occur in the sheet metal of doors, and/or vehicular body portions which are relatively inaccessible, or, at least not readily observable with the unaided eye, it is necessary to provide a pointer which will designate the location of the hidden working end of the tool so that the restorative forces will apply force in the proper location. Thus, in order to target the working end of the tool, a mechanical pointer is provided and is constructed to be disposed in registered alignment with the working end. The mechanical pointer, of course, is situated so that it can be readily observed by the user and can be so positioned that the user is given reasonable assurance that the working end of the tool is lined up immediately opposite the pointer on the other side of the damaged sheet metal.

For many reasons which will be explained in the disclosure of my invention hereinafter, prior art tools have proved inadequate for use by a wide variety of users of highly varying skills and abilities. The intensity of the light, the lack of intuitive skills by different users and operators, the variations in the thickness of the sheet metal makes the proper positioning of the working end absolutely of critical importance.

SUMMARY OF THE PRESENT INVENTION

The present invention contemplates the provision of an easy to use tool which is of great accuracy in performing its intended purpose and produces uniformly good results, even when employed by relatively unskilled workers. Specifically, it is contemplated that there be provided a tool which utilizes a laser beam instead of a mechanical pointer.

The laser beam is capable of projecting a small, very bright dot. I use that characteristic of a laser beam to designate the exact location of the working end of the tool. Thus, in the same manner as a mechanical pointer, when the tool is behind the sheet metal working medium to be repaired and becomes figuratively "lost" to the operator of the tool, the laser beam projects its small beam precisely and accurately onto the surface of the sheet metal to produce a dot at and coinciding with the exact location of the working end of the tool. The user can manipulate the working end of the tool with full assurance that no new damage will be caused to the sheet metal by incorrect manipulation of the tool at the wrong or misaligned spot.

The laser arrangement of the present invention is more accurate than the mechanical pointer, since it eliminates mechanical linkages with inherent loose, or sloppy, tolerances. It is less cumbersome and can be used more effectively. I further contemplate that there be provided a focusing means for the laser beam, and if desired, a prism can be utilized to bend the beam, thereby to afford better control and improved access to particularly difficult locations on the sheet metal, or to adjust the angle at which the beam intersects the workpiece.

DESCRIPTION OF THE DRAWINGS

FIG. 1 is a side elevational view of a tool provided in accordance with the principles of the present invention.

FIG. 2 is an elevational view of the tool of FIG. 1, but supplemented by the addition of an adjustable prism, thereby to selectively adjust the projection of the laser beam.

FIG. 3 is a an enlarged fragmentary view of the working end of the tool of FIGS. 1 and 2 to illustrate additional details of the working tool of the present invention.

FIG. 4 is a perspective view showing the tool of the present invention in a working environment and depicting how the improvements of the present invention may be put to use in actual practice.

FIG. 5 is a fragmentary exploded view of a laser assembly suitable for use in the combination of the present invention and showing additional details of how the laser beam may be adjustably focused by the user.

DESCRIPTION OF THE PREFERRED EMBODIMENTS

In the field of repair of minor sheet metal dents, the devices of the prior art are particularly deficient. For example, when small dents, or dings, are filled, ground, sanded, polished and repainted, the original painted sheet metal surface is permanently scarred and labels the surface as having been damaged, however minor, requiring paint work. Further, almost always, the color, tone and depth of the repainted area will never quite match the original factory finish. Again, even the most artistically applied repair will age or fade at an inconsistent rate relative to the original surface and the repair becomes obvious.

Other disadvantages include the waste of sandpaper or emery cloth, the necessity of surface preparation chemicals, towels and rags, paint and paint applicators and equipment, and the time and attention of skilled body mechanics specially trained in body and fender work.

The present invention exploits the art of paintless dent repair wherein small dents, defined as 1.50 inches in diameter, or less, can be restored without the necessity of painting and/or refinishing.

Referring to FIG. 1, there is disclosed a tool 10 particularly suited for effecting the repair of small dents by the so-called paintless dent repair technique. The tool 10 has an operating handle 11 by means of which the user may manipulate the tool 10 in performing its function. The handle 11 is on the end of a maraging bar 12, which may selectively vary in size, typically ranging from one eighth (⅛) inch to five eighths (⅝) inch in diameter. The marging bar 12 is made of particularly hard tempered steel or similar metal and is cylindrical in shape and of sufficient rigidity that the user may exert force through the elongated longitudinal axis of the bar 12 to a working end part shown generally at 13.

The working end 13 of the bar 10 may either be a straight longitudinal co-axial piece, or, as shown in FIGS. 1 and 3, may be offset, for example, as shown in the drawings, bent at right angles, or any selected angulation, relative to the axis of the elongated longitudinally extending bar 12.

In order to accommodate the use of different sizes, shapes and angles of the working end 13, the end of the bar 12 is recessed as at 14 and receives the working end part 13 in fitted together relation. Referring to FIG. 3 in conjunction with FIG. 1, it will be noted that the working end part 13 has a first cylindrical section 15 which fits into the recess 14 and is coaxial with the axis of the bar 12. A second cylindrical section 16 is offset at 90 degrees, i.e., at right angles, the two cylindrical sections being joined by a curved transition portion 17. At the end of the section 16, a replaceable tapered part 18 is provided, which in turn, seats and positions a selectively replaceable ball 19.

The tapered part 18 may be selectively changed by fastening in the fastening joint shown at 20 to accommodate the ball 19 which may be selectively varied in size by using different sized balls 19 ranging in size from one eighth (⅛) inch to one fourth (¼) inch. The balls 19 may conveniently take the form of hardened steel ball bearings which are virtually indestructible, and may be fixed in permanent firm assembly by an appropriate adhesive in the end of the tool 10.

The ball 19 forms a rounded working surface which can be utilized by the user to engage the hidden surface of the sheet metal workpiece. It will be understood, of course, that the formation of a ding, or small dent, in the sheet metal surface of an automotive vehicle usually occurs in such a manner that the outer exposed or visible surface of the sheet metal is dented, or depressed, so that a portion of the sheet metal material is actually deformed inwardly and projects out of level with the hidden side of the sheet metal. In order to repair such damage, it is necessary for the repair person to engage the damaged area and to deformably restore the dented area to a level flat condition. Dings, or small dents, can be manipulated by pressing or rubbing the working surface of the ball 19 against the protrusion and pressing it outwardly until flatness is restored.

In accordance with the present invention, instead of a mechanical pointer, the tool 10 is provided with a laser mechanism to generate a beam of visible light and to project the beam of light with great accuracy and with maximum visibility to produce a small dot or spot, so that the user may operate the tool with certainty as to the location of the working end 13 of the tool 10.

Referring further to FIG. 1, there is shown at 21 a laser support and base which is longitudinally adjustable along the length of the bar 12 and may be locked in selected adjusted axial positions by a lock 22. Extending uprightly from the support and base 21 is a post 23 to which is connected at its free end a swivel mount 24. The swivel mount 24 carries in adjustable assembly therewith a laser positioning rod 26 cooperating with a mounting device 27. In order to adjust the rod 26 both angularly and longitudinally, it is adjusted with the cooperation of the mounting device 27 and the swivel mount 24 and may be locked and secured in selected angular and longitudinally adjusted positions.

A laser holding clamp 30 is mounted on the end of the laser positioning rod 26 and carries a laser assembly 31 therein which may be locked in place by tightening a clamp lock 32.

The laser assembly includes a casing 33 carrying an on-off toggle type switch 34 at one end thereof. At its opposite end, the casing 33 has a barrel 36 enclosing a laser functioning as the emitting source of a laser beam and disposed to project light in the form of the beam 40 axially outwardly of the barrel 36 through a focusing lens 41. The lens 41 is externally screw threaded as at 42 and may be axially turned in and out of corresponding screw threads formed internally in the barrel 36 so that the focusing lens 41 may adjustably vary the focus of the laser beam 40.

With the adjustable focus provision, the size of the laser dot on the working surface of the sheet metal can be changed in diameter and the dot can be projected over wide range of focal distances from three (3) inches to sixty (60) inches.

In addition to the toggle switch 34, I have provided the combination of the toggle switch 34 and a pressure switch 44 wired so that both switches can turn the laser light source with the barrel 36 on or off. The pressure switch 44 has an actuator 46 located immediately adjacent the handle 11 of the tool 10 so that it is readily accessible to the user thereby permitting the user or operator to turn the laser on and off without having to take the hands off of the tool handle 11, or to touch the laser itself.

The casing 33 of the laser assembly 31 has a wiring conduit pig tail 47 connected to the wiring control circuit and has a connector 48 on the end thereof. A conductor 49 leads from the pressure switch 44 to the connector 48 and may be plugged into the connector 48 for mechanical and electrical connection therewith.

With the use of a laser beam, different colors may be employed since the production of a laser beam is independent of color. Thus, laser beams may be advantageously employed which are red, green, blue, purple or orange. In actual practice, I have successfully employed an orange colored beam having a wavelength of 635 NM. However, other light sources may be advantageously used without departing from the spirit of this invention.

With the use of a laser beam 40 as a locator for the tool, I have also provided the option illustrated in FIG. 2 of the drawings, namely, the provision of some means of bending the light beam to effect a change of direction of the beam, if such bending is necessary or desirable. Such bending can be provided by a prism, or by a mirror or a combination of lenses, or for that matter, any other means of bending light. However, for an exemplification of a practical way of effecting the function, there is disclosed in FIG. 2 a prism support and base 50 having lock 51 so that the support and base 50 may be adjustably positioned along the longitudinal length of the bar 12 of the tool 10 in a selected axial setting. A support post 52 rises from the base 50 and carries a prism positioning clamp 53 by means of which a prism positioning rod 54 can be adjustably supported.

The end of the rod 54 has mounted thereon a prism clamp 56 in which is mounted a prism 57. The clamp 56 has adjustment means 58. By means of such provision, the prism 57 may be positioned to intersect the beam 40 and to bend the direction of the beam 40 from its original path as shown to the left of the prism 57 using the orientation of FIG. 2 to the changed path of the beam 40 as shown to the right of the prism 57 as shown in FIG. 2.

Bending the laser beam 40 may be useful in facilitating the use of the tool 10 by an operator in a particularly difficult operating environment. It is also useful in controlling the angle at which the beam 40 intersects the workpiece. Clearly, if the angle of intersection can be as close to 90 degrees as possible, that would be optimum.

Turning now to FIG. 4, in conjunction with the description already given in connection with the other figures of the drawings, there is shown as a typical small dent workpiece a door 60 of an automotive vehicle in which a sheet metal surface 61 has been subjected to damage in the form of a small dent indicated by a target area 62. The door 60 has a window frame portion 63 and there is a portion below the window frame portion 63 which is concealed and may be referred to as a frame wall. It will be understood that the frame wall, although not shown in the drawings, is that portion of the door 60 which is disposed generally at what is a right angle to the sheet metal surface 61. It may be necessary to drill an access hole in the frame wall in order that the working end 13 and a substantial portion of the bar 12 may pass therethrough and enter the space within the interior of the door 60 behind the sheet metal surface 61. When so positioned, of course, the working end 13 is figuratively "lost" since it is completely hidden and relatively invisible to the eyes of the tool 10 user.

Were the user to blindly start manipulation of the tool 10 at an improper location, it is possible that the user might inflict more damage to the sheet metal surface 61, since the gauge thickness of the surface 61 is apt to be quite thin, and hence quite flexible. Thus, it is imperative that the tool 10 be aligned precisely and exactly opposite the ding, or small dent, 62.

Moreover, a large splash of light, or a diffused light beam, would not be effective as a locator, because the area impacted by the splash, or large beam, would be too large and insufficiently precise in locating the working end 13 of the tool 10. By virtue of my invention, a sharply focused narrow beam of light projects a small optimum size dot of light to the precise location of the ball 19 on the working end 13 of the tool 10. Therefore, the user merely projects the dot of light projected by the laser beam 40 onto the target area 62 of the ding 62 and the user can reliably and quickly alleviate the damaged condition of the sheet metal surface 61 by pressing the ding outwardly with the ball 19, thereby restoring the sheet metal surface 61 without the necessity of repainting with all of its attendant prerequisites of sanding, filling, grinding and polishing, etc, etc.

The laser assembly 31 is fully interchangeable with a plurality of repair tools 10. As noted previously, the repair tool 10 may be varied in sized by selecting thin bars 12 or thicker bars 12, ranging from 1/8" to 5/8" in diameter. However, simply by shifting the laser assembly 31 and its mounting accessories, a single laser assembly 31 can be used with a plurality of tools. The laser pointer eliminates many of the numerous parts of a mechanical pointer system, while affording a much higher degree of accuracy and convenience in usage. The laser assembly 31 can also be used to retrofit existing tools.

Although minor modifications might be suggested by those versed in the art, it should be understood that I wish to embody within the scope of the patent warranted hereon all such modifications as reasonably and properly come within the scope of my contribution to the art.

I claim as my invention:

1. A repair tool for fixing a ding in the sheet metal of an automotive vehicle comprising in combination:

an elongated bar having a handle at one end and a working head at the other end, said working head comprising a replaceable ball of a size selected to engage the ding on the hidden side of the sheet metal, and a pointer connected to said tool comprising a laser beam generating means constructed and arranged to generate a beam of laser light and for projecting said laser beam to produce a small locator dot of light onto the visible side of the sheet metal exactly opposite said working head hidden on the other side of said sheet metal, thereby to facilitate paintless dent repair of the ding.

2. A tool as defined in claim 1 wherein said laser beam generating means includes an adjustable focusing means to focus the laser beam to project a small dot of optimum size.

3. A tool as defined in claim 2 wherein said tool includes an adjustable means for selectively bending the laser beam to change and adjust the direction thereof.

4. A tool as defined in claim 1 wherein said laser beam generating means comprises a pressure switch having an actuator responsive to pressure located immediately adjacent said handle so that the operator of the tool may actuate the laser without moving the hands from the handle and without touching the laser beam generating means.

5. A tool as defined in claim 1 wherein said working head includes replaceable fittings at the end thereof for accommodating balls of selectively different size.

6. For use in a small dent repairing tool of the type used in paintless dent repair, and including an elongated steel rod with a handle at one end and a working head at the opposite end, with an elongated cylindrical body intermediate the ends, the improvement of a pointer:

said pointer comprising, in combination, laser beam generating means having, a laser support base, means on said base for adjustable connection to an intermediate body portion of the steel rod of the tool, a laser assembly, adjustable mounting means carrying said laser assembly on said laser support base, said laser assembly comprising a casing having a laser light source enclosed within a barrel and projecting a laser beam through an adjustable focusing means axially outwardly from the barrel, whereby the laser beam functions as a pointer and may be adjustably focused and directed to project a small dot of light to a location precisely opposite said working head, thereby to facilitate alignment of the working head when hidden behind a sheet metal surface with the location of a small dent to be removed.

7. In combination, a steel bar of elongated longitudinal length and cylindrical in configuration and being of a selected diameter, a handle affixed to said steel bar at one end thereof, by means of which the steel bar may be manipulated as a component of a working tool, a working end part affixed to said steel bar at the other end thereof and having a hardened steel ball of selected size compatible with the selected diameter of said steel bar at the free end of said working end part, thereby to form a hard working surface for engaging against the inwardly deformed portions of a small dent formed in a sheet metal workpiece, a base member connected to said steel bar inwardly of its ends, a laser beam assembly connected to said base member, adjustment means connected to and between said laser beam assembly and said base member for pre-adjusting and pre-aligning said laser beam assembly to project a laser beam to produce a small dot of light precisely opposite said ball, whereby said ball can be accurately positioned to engage the inwardly deformed portion of a small dent in a sheet metal workpiece even when the working end part is hidden behind the workpiece to facilitate repair of the small dent.

8. A tool as defined in claim 2 wherein said tool includes light bending means for selectively bending the laser beam to change and adjust the direction thereof.

9. A tool as defined in claim 8 wherein said light bending means comprises an adjustable prism.

10. A tool as defined in claim 8 wherein said light bending means comprises a mirror.

11. A tool as defined in claim 8 wherein said light bending means comprises a combination of lenses.

* * * * *